US007190256B2

(12) United States Patent
Pieper

(10) Patent No.: US 7,190,256 B2
(45) Date of Patent: Mar. 13, 2007

(54) SECURITY METHOD FOR GAINING ACCESS, ACCESS VERIFICATION DEVICE, AND ELEVATOR

(75) Inventor: Norbert Pieper, Koblenz (DE)

(73) Assignee: Deutsche Post AG., Bonn (DE)

( * ) Notice: Subject to any disclaimer, the term of this patent is extended or adjusted under 35 U.S.C. 154(b) by 218 days.

(21) Appl. No.: 10/795,601

(22) Filed: Mar. 8, 2004

(65) Prior Publication Data

US 2004/0188185 A1 Sep. 30, 2004

Related U.S. Application Data

(63) Continuation of application No. PCT/DE02/02932, filed on Aug. 8, 2002.

(30) Foreign Application Priority Data

Sep. 20, 2001 (DE) ................................ 101 46 459

(51) Int. Cl.
*G05B 19/00* (2006.01)

(52) U.S. Cl. ........................................ 340/5.7; 340/5.2

(58) Field of Classification Search ................. 340/5.7, 340/5.31, 5.21, 3.9, 5.1, 5.27, 5.2; 187/392; 282/11
See application file for complete search history.

(56) References Cited

U.S. PATENT DOCUMENTS 4,847,485 A 7/1989 Koelsch ...................... 250/221
5,932,853 A 8/1999 Friedli et al. ............... 187/392
6,528,954 B1 * 3/2003 Lys et al. .................... 315/291
6,697,104 B1 * 2/2004 Yakobi et al. .............. 348/143
6,707,374 B1 * 3/2004 Zaharia ...................... 340/5.31

FOREIGN PATENT DOCUMENTS

| | | | |
|---|---|---|---|
| DE | 36 23 792 | C1 | 12/1987 |
| EP | 832 839 | A1 | 4/1998 |
| EP | 940 775 | A2 | 9/1999 |
| JP | 11-209016 | * | 8/1999 |
| WO | WO 01/07353 | A1 | 2/2001 |

OTHER PUBLICATIONS

International Preliminary Examination Report in PCT/DE02/02932 dated Dec. 19, 2003.

* cited by examiner

*Primary Examiner*—Wendy R. Garber
*Assistant Examiner*—Matsuichiro Shimizu
(74) *Attorney, Agent, or Firm*—Marshall, Gerstein & Borun LLP

(57) ABSTRACT

The disclosure relates to a security method for gaining access, which allows authorized persons to gain access to a protected area and prevents access by unauthorized persons. The method is characterized in that a number of persons in a verification area are determined, a number of authorization passes present in said area are verified, the number of persons and the number of authorization passes are compared and if the number of persons agrees with the number of authorized passes, an access approval signal is generated. The disclosure also relates to a device that is suitable for carrying out the method and for an elevator equipped with such a device.

19 Claims, 4 Drawing Sheets

Transponder reference

Thermal image

SECURITY METHOD FOR GAINING ACCESS, ACCESS VERIFICATION DEVICE, AND ELEVATOR

This is a continuation of International Application No. PCT/DE02/02932 filed Aug. 8, 2002, the entire disclosure of which is incorporated herein by reference.

BACKGROUND OF THE DISCLOSURE

1. Field of the Disclosure

The disclosure relates to a method for access verification by means of which the access of authorized persons to a protected area is permitted while the access of unauthorized persons is prevented, and to a device for access control as well as to an elevator car.

2. Related Technology

Many access control systems are known for preventing unauthorized entry into protected areas, especially buildings or certain areas of buildings.

Known access control systems involve checking each person seeking entry.

International Patent Publication WO 01/07353 A1, for example, discloses an elevator with access monitoring. The access monitoring is made possible by two physically separated motion detectors whose receiving field characteristics differ from each other, whereby one motion detector is attached to the elevator and the other is attached outside of the elevator. The motion detectors are designed in such a way that a person passing through the receiving field triggers a signal in the receiver of the motion detector.

Depending on the time sequence of the signals triggered in the pertinent receiver, a determination is made as to whether the person is moving into or out of the elevator.

Moreover, signals from transmitters present on persons are registered and evaluated. An authorization check is made on the basis of the evaluation of the transmitter signals. The authorization check as well as the signals of the motion detectors are used to determine whether a person who is accessing a certain floor is authorized to do so.

European Patent Publication EP 940 775 A2 discloses a passage lock and a method to operate such a passage lock. The passage lock has contact-free access control means based on a transponder system. Moreover, the sensors on the doors of the passage lock allow registration of the number of persons moving through the lock.

Furthermore, European Patent Publication EP 832 839 A1 discloses an identification system for an elevator installation. An elevator user carries an information transmitter, whereby the information transmitter sends individual data such as, for example, weight and height of the elevator user as well as a desired floor of the building to a recognition device inside the elevator. The described information transmitter uses electromagnetic waves for transmitting the information.

Moreover, a separate unit determines the momentary weight of the elevator.

When an elevator user enters the elevator, a comparator compares the measured increase in the weight of the elevator to the transmitted weight data of the elevator user who has entered. If the measured increase in the weight of the elevator and the transmitted weight data match, then the comparator sends a release signal to an elevator control unit so that the elevator is activated.

Elevator users without information transmitters are detected through the determination of the increase in the weight of the elevator, whereby the determination of an increase in the weight of the elevator for which there is no transmitted weight data causes an interruption in the elevator service.

U.S. Pat. No. 4,847,485 describes means to determine the number of persons and direction of movement inside a monitored room or a pass-through. At least two infrared sensors installed in a passage area at a fixed angle measure the ambient temperature over the course of time. The passage area can only be entered by using an identification reader so that the specific temperature patterns are used to check whether the number of persons who have entered the passage area is equal to the number of identification cards detected by the identification card reader.

SUMMARY OF THE INVENTION

The disclosure provides a method suitable for a quick and reliable determination of the number of persons and for checking their authorization, and a device for executing the method.

The disclosure also provides an elevator car that allows a contact-free and reliable determination of the number of persons present in the elevator car.

According to the disclosure, the number of persons present in a checking area is determined by detecting heat radiation emitted by people, and comparing the same to optical data. The result of this comparison is used to determine the number of persons, and the number of authorization passes present in the area is checked and the number of persons is compared to the number of authorization passes.

The access release signal can be displayed visually, for example, or it can automatically release an admission mechanism.

According to the disclosure, the authorizations of persons need not be individually checked, but the number of persons and the number of authorization passes are determined (preferably separately) and compared to each other.

The determination of the number of persons and the number of authorization passes is preferably carried out essentially simultaneously in order to avoid the possibility of manipulation.

In this manner, access to the secured area can be prevented without each person having to be checked. However, checking every person individually can optionally be integrated into the method, if this is desired for other reasons, for example, in order to ascertain the entry times of individual persons.

In order to further accelerate the admission of persons to the secured area, it is advantageous for the access release signal to control access means, which clears access for all of the persons present in the checking area.

Advantageously, the number of persons present in the checking area and the number of authorization passes present in the checking area are compared to each other in a computer.

The term “computer” is by no means to be understood in a limiting manner. This can be any means suitable for performing computations, for example, a work station, a personal computer, a microcomputer, or circuitry suitable for performing computations.

Many means can be used to check the number of persons and/or the number of authorization passes, whereby electronically readable sensors are especially well-suited for this purpose.

In a preferred embodiment, heat radiation emitted by the persons is detected in order to determine the number of persons. It is especially advantageous for local maximum values of the heat radiation to be determined.

In order to avoid technical heat sources from erroneously being detected as persons, it is preferred that, in calculating the maximum values, temperatures that are much higher than the body temperature of humans are not taken into account.

This embodiment has the advantage that it prevents other heat sources, for example, cigarettes, from being counted as persons.

Moreover, it is preferred that optical data is taken into account in determining the number of persons.

In order to further reduce the number of erroneous detection events as persons, it is preferable for the detected heat radiation to be compared to the optical data and for the result of this comparison to be incorporated into the determination of the number of persons.

Moreover, it is advantageous that only those detection events are taken into account in which the optical data as well as the detected heat radiation indicate the presence of a person. In this manner, the probability of inadvertently counting a person who is not present is considerably reduced.

In another embodiment, electromagnetic radiation emitted from the checking area is detected and sources of electromagnetic radiation with a certain beam characteristic are detected as authorization passes.

In an especially preferred embodiment, the checking area corresponds essentially to an inner space or to the interior of an elevator car.

Advantageously, this embodiment of the method is configured in such a way that the elevator car only moves from an accessible area to a secure area once the number of persons matches the number of authorization passes.

Preferably, an alarm signal is generated if the number of persons does not match the number of authorization passes. Moreover, it is advantageous for the alarm signal to be transmitted to a security center.

In order to increase the transporting speed of the elevator system, it is advantageous for the number of persons and/or the number of authorization passes to be determined during the closing of the door of the elevator car.

This avoids a standstill of the elevator after the closing of the elevator door. This translates into an increase in the transporting capacity of the elevator system, and avoids causing irritation to the persons standing in the elevator since the checking procedure is not noticed by the persons.

In order to prevent access by an unauthorized person even with this accelerated procedure, it is advantageous to check whether another person has gained access to the elevator car during the closing phase of the elevator door. To this end the elevator door is preferably equipped with means to detect the passage of persons. This means is, for example, a light barrier or an ultrasound sensor.

In order to reliably prevent unauthorized access to the protected area, it is advantageous for the number of persons and/or the number of authorization passes to be checked once again if a person enters the elevator car during the closing phase.

Further, according to the disclosure, a device for access control includes means to check the number of persons and to essentially simultaneously detect the number of authorization passes and, furthermore, contains at least one thermal image camera, and at least one antenna for detecting electromagnetic signals.

The device is equipped with a suitable device for detecting the number of persons, preferably a thermal image camera or a CCD chip. The number of authorization passes present in the checked area is preferably checked by at least one antenna.

The disclosure also describes an elevator equipped in its floor and/or ceiling with means to detect persons, and the elevator car is provided with means to detect the number of authorization passes and in that there are several equidistant light emitters in the surface of the elevator floor.

Equipping the elevator with means to detect the number of persons and/or the number of authorization passes allows an especially simple and reliable design of buildings with different access areas.

Thus, for example, it is possible to make individual areas of a building more accessible than other areas.

Areas of application for this especially preferred embodiment are in particular those buildings in which a partial area is at least partially open to the public such as, for example, a hotel lobby or an entrance area of an office building or a residential building that is open to the public.

In this manner, visitors can move freely in the foyer of the building, for example, in order to go to information counters, cafeterias or restaurants that are open to the public, whereas access to the secured area or areas, for example, to other floors where there are offices, hotel rooms or apartments, is prevented.

DETAILED DESCRIPTION

The method and device will be described with reference to the example of an elevator that allows transportation into the secured area.

However, the disclosure is not limited to the case described here, since the disclosed devices can be replaced with other devices that have equivalent effect. However, it is especially advantageous to equip elevators with the security features as described since the elevators can serve for security checking as well as for transportation.

Figure 1:
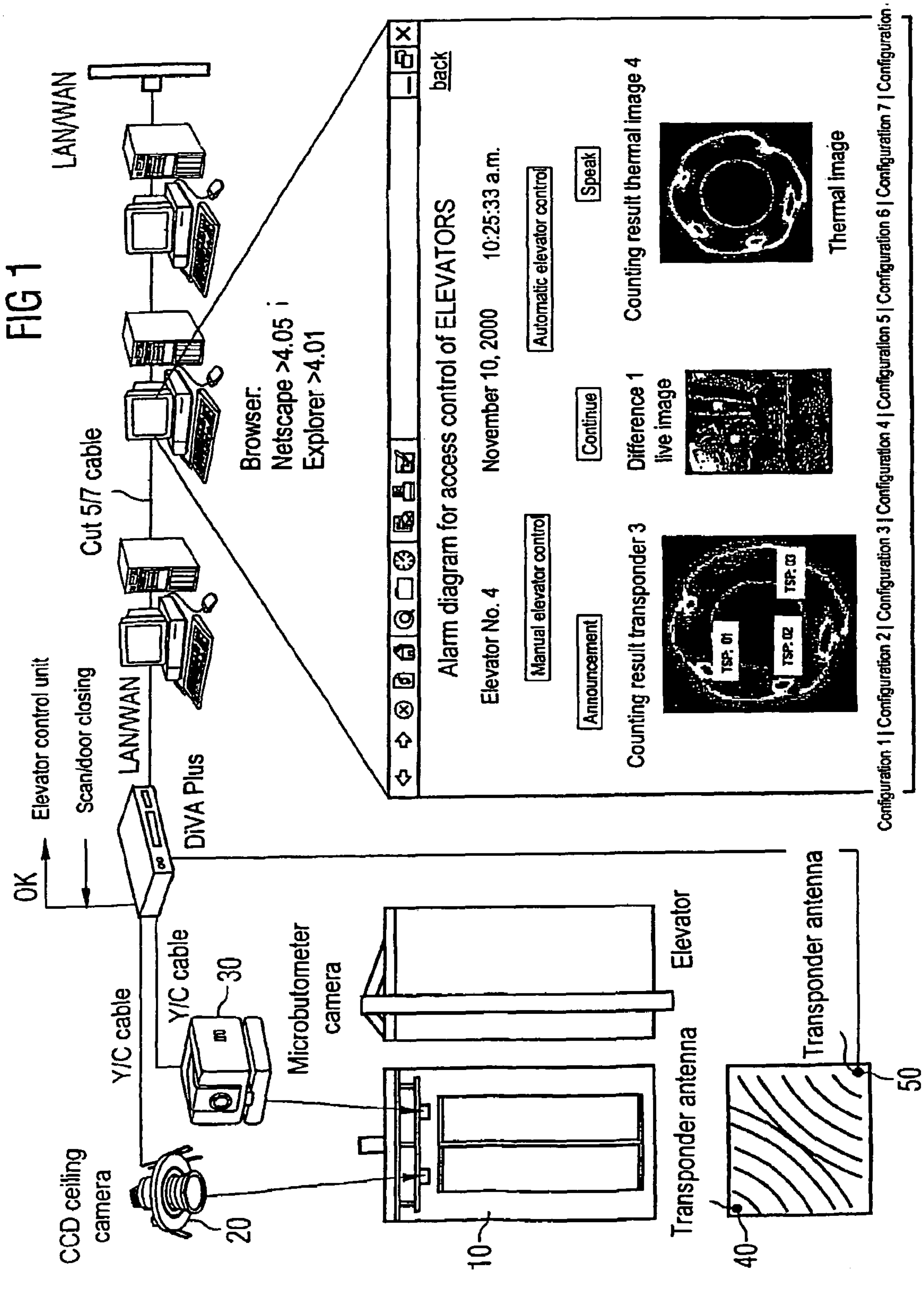
FIG. 1—an elevator equipped with access verification according to the invention, FIG. 2—a screen depiction of detected counter results, FIG. 3—an arrangement of a door security means, and FIG. 4—a floor equipped with recognition sensors.

An elevator 10 shown in FIG. 1 is equipped with a CCD camera 20 and a microbutometer camera 30, both preferably mounted in the upper area of the elevator car so that they can have on overview of the entire interior of the elevator car.

There are one or more antennas 40, 50 in the area of the elevator car. The antennas 40, 50 are preferably configured as transponder antennas and can ascertain the presence of transponders, and are preferably physically arranged at a distance from each other so that they can also determine the positions of the authorization passes that are present in the elevator car.

The persons detected by the CCD camera 20 and by the microbutometer camera 30, like the positions of the authorization passes detected by the antennas 40, 50, are transmitted via a data transmission network to a computer that serves to the evaluate the collected data.

The computer determines the number of persons present in the elevator on the basis of the heat distribution and determines the number of authorization passes on the basis of the signals detected by the antennas 40, 50.

Using the device shown, the method is carried out as follows:

When the door of the elevator 10 opens, persons enter the elevator in the usual manner. During or after the closing of the doors of the elevator, the cameras 20 and 30 determine the number of persons present in the elevator while the antennas 40 and 50 determine the number of authorization passes present in the elevator.

Moreover, the positions of each of the persons and authorization passes are determined.

Control images of the detected thermal image and of the detection events of the antennas 40, 50 are displayed on monitors or on sections of monitors. An alarm is triggered if there is a difference between the number of authorization passes and the number of persons. In the case shown, four persons were registered whereas only three authorization passes were counted.

By comparing the thermal image taken and the positions of the detected transponders, the position of a person who does not have an authorization pass can be determined.

Figure 2A:
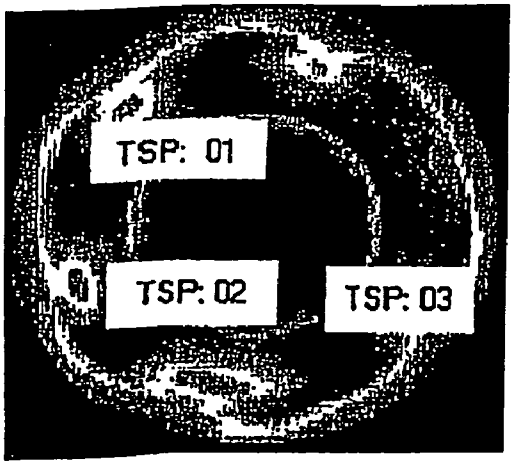
Figure 2B:
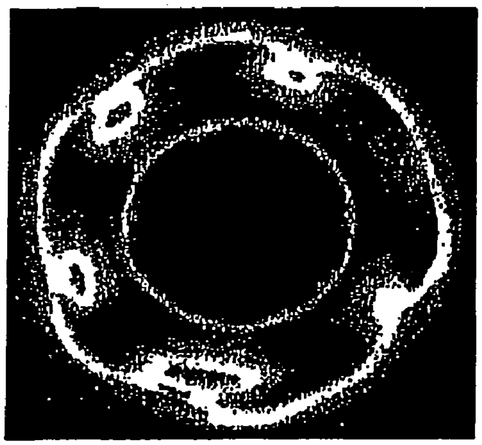

The individual images taken are shown in FIG. 2 in the partial images a) and b). Both partial images show the thermal image, that is to say, the radiation distribution of the emitted thermal radiation. The partial image a) additionally shows the transponder positions that were found.

A comparison of the images reveals that there is a person on the right-hand edge of the image who is not carrying an authorization pass.

In order to further improve the method and to advantageously refine the device, the elevator door can be equipped with additional antennas and/or additional person detection means.

In this manner, it is possible to discover the entry of persons during the closing phase of the doors of the elevator. For example, in situations where a high level of security is desired, the closing process is interrupted if the—undesired—entry of a person occurs during the closing phase of the elevator.

Figure 3:
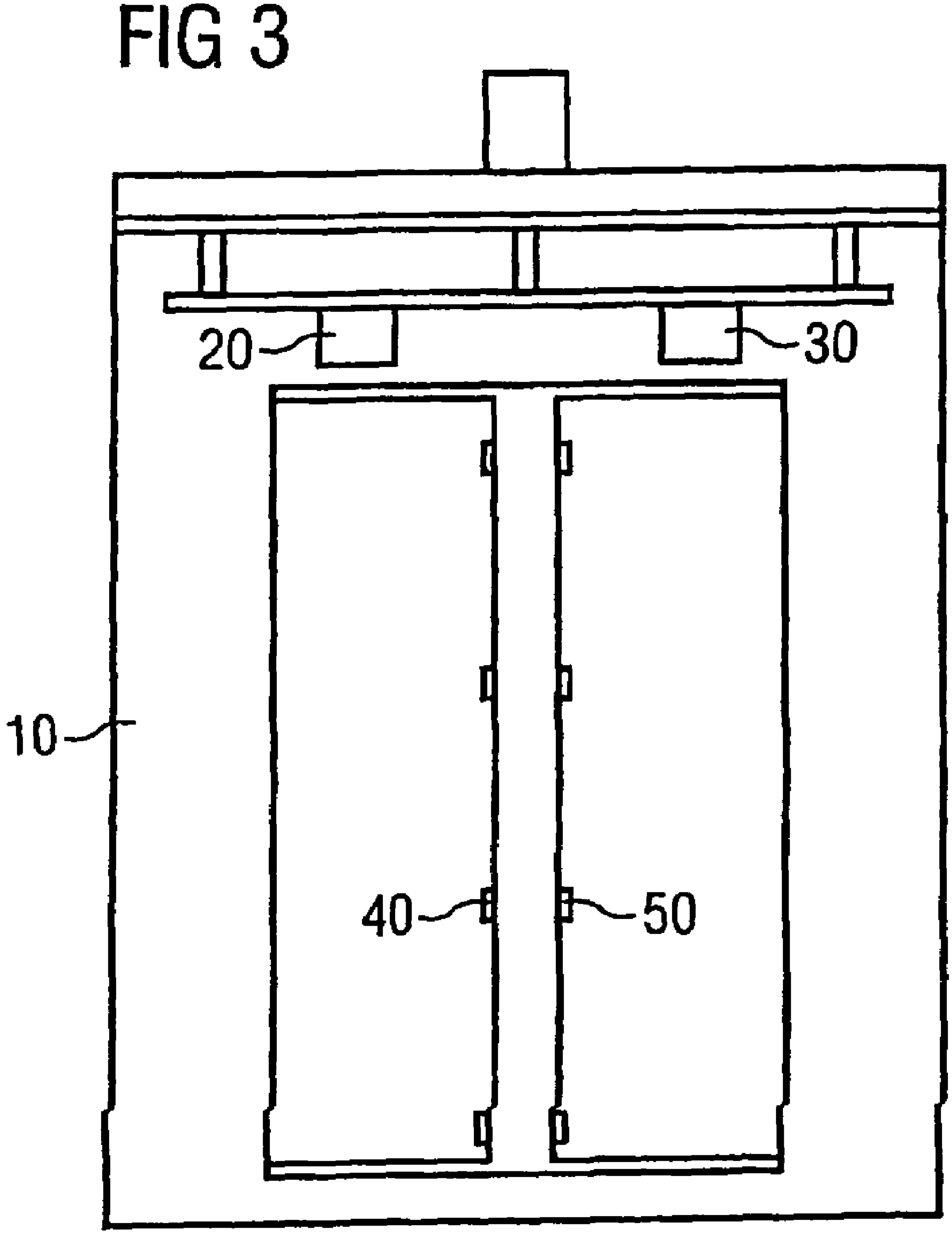

An antenna arrangement that is suitable for this purpose is depicted in FIG. 3.

Another improvement of the precision of the detection of persons can be achieved in that the floor and/or the ceiling of the elevator car are equipped with means to detect persons.

Figure 4:
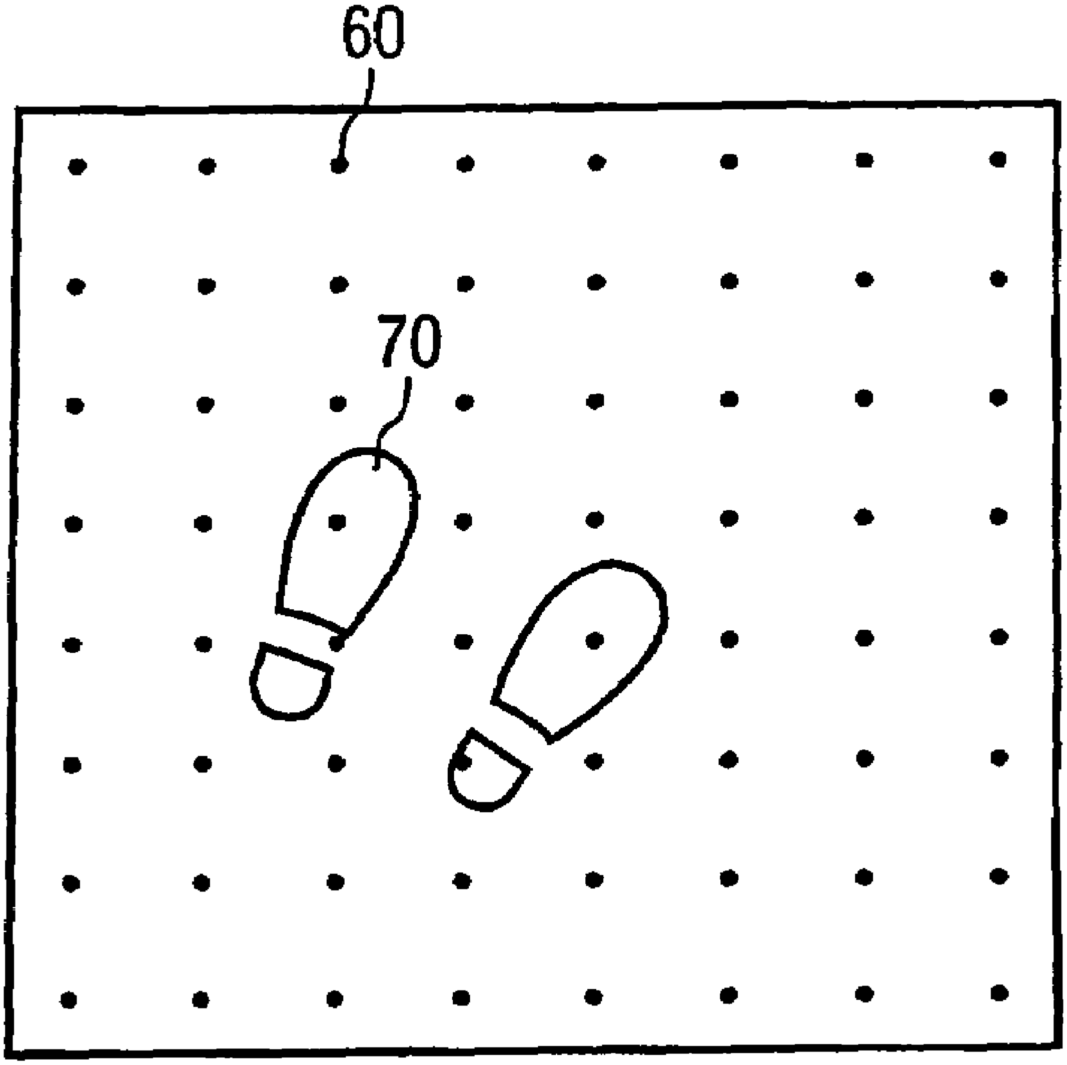

A floor configured in this manner is shown by way of an example in FIG. 4.

For example, it is possible for there to be several, preferably equidistant, light emitters 60, for example, light emitting diodes (LED), in the surface of the elevator floor.

In this manner, it is possible to determine zones in which the light from the light sources is absorbed, and thus, for example, to make a distinction between persons' foot positions 70 and of other persons who are attempting to hide in the floor area.

The invention claimed is:

1. A method for access verification whereby the access of authorized persons to a protected area is permitted while the access of unauthorized persons is prevented, comprising the steps of determining the number of persons present in a checking area by acquiring optical data, detecting heat radiation emitted by people, comparing the detected heat radiation to the optical data, using the result of this comparison to determine the number of persons, ignoring data other than data in which the optical data and the detected heat radiation indicate the presence of a person, checking the number of authorization passes present in the area, and comparing the number of persons to the number of authorization passes.

2. The method according to claim 1, comprising generating an access release signal if the number of persons matches the number of authorization passes.

3. The method according to claim 1. comprising substantially simultaneously determining the number of persons and the number of authorization passes.

4. The method according to claim 2, comprising controlling access means by the access release signal, and clearing access for all of the persons present in the checking area by the access means.

5. The method according to claim 1, comprising comparing the number of persons present in the checking area to the number of authorization passes present in the checking area.

6. The method according to claim 1, comprising determining local maximum values of the heat radiation.

7. The method according to claim 6, comprising ignoring temperatures much higher than human body temperature.

8. The method according to claim 1, comprising detecting electromagnetic radiation emitted from the checking area and sources of electromagnetic radiation with a certain beam characteristic as authorization passes.

9. The method according to claim 1, wherein the checking area comprising an inner space or the interior of an elevator car.

10. The method according to claim 9, comprising allowing the elevator car to move from an accessible area to a secure area only if the number of persons matches the number of authorization passes.

11. The method according to claim 9, comprising generating an alarm signal if the number of persons does not match the number of authorization passes.

12. The method according to claim 11, comprising transmitting the alarm signal to a security center.

13. The method according to claim 9, comprising determining at least one of the number of persons and the number of authorization passes during closing the door of the elevator car.

14. The method according to claim 13, comprising checking whether another person has gained access to the elevator car during closing of the elevator door.

15. The method according to claim 14, comprising checking whether another person has grid access to the elevator or during closing of the elevator door with a light barrier.

16. The method according to claim 14, comprising again checking at least one of the number of persons and the number of authorization passes if a person enters the elevator car during closing of the elevator door.

17. An elevator car, comprising at least one of a floor and a ceiling equipped with means to detect persons and to detect a number of authorization passes, a plurality of equidistant light emitters in a surface of the elevator floor, and means to determine zones in which light from the light emitters is absorbed in order to distinguish between the foot positions of persons with authorization passes and other persons.

18. The elevator car according to claim 17, wherein the equidistant light emitters are light emitting diodes.

19. The elevator according to claim 17, wherein an elevator door is equipped with at least one additional antenna and additional means to detect persons.

* * * * *